No. 613,244. Patented Nov. 1, 1898.
C. C. CHRISMAN.
BICYCLE.
(Application filed Aug. 31, 1897.)
(No Model.)
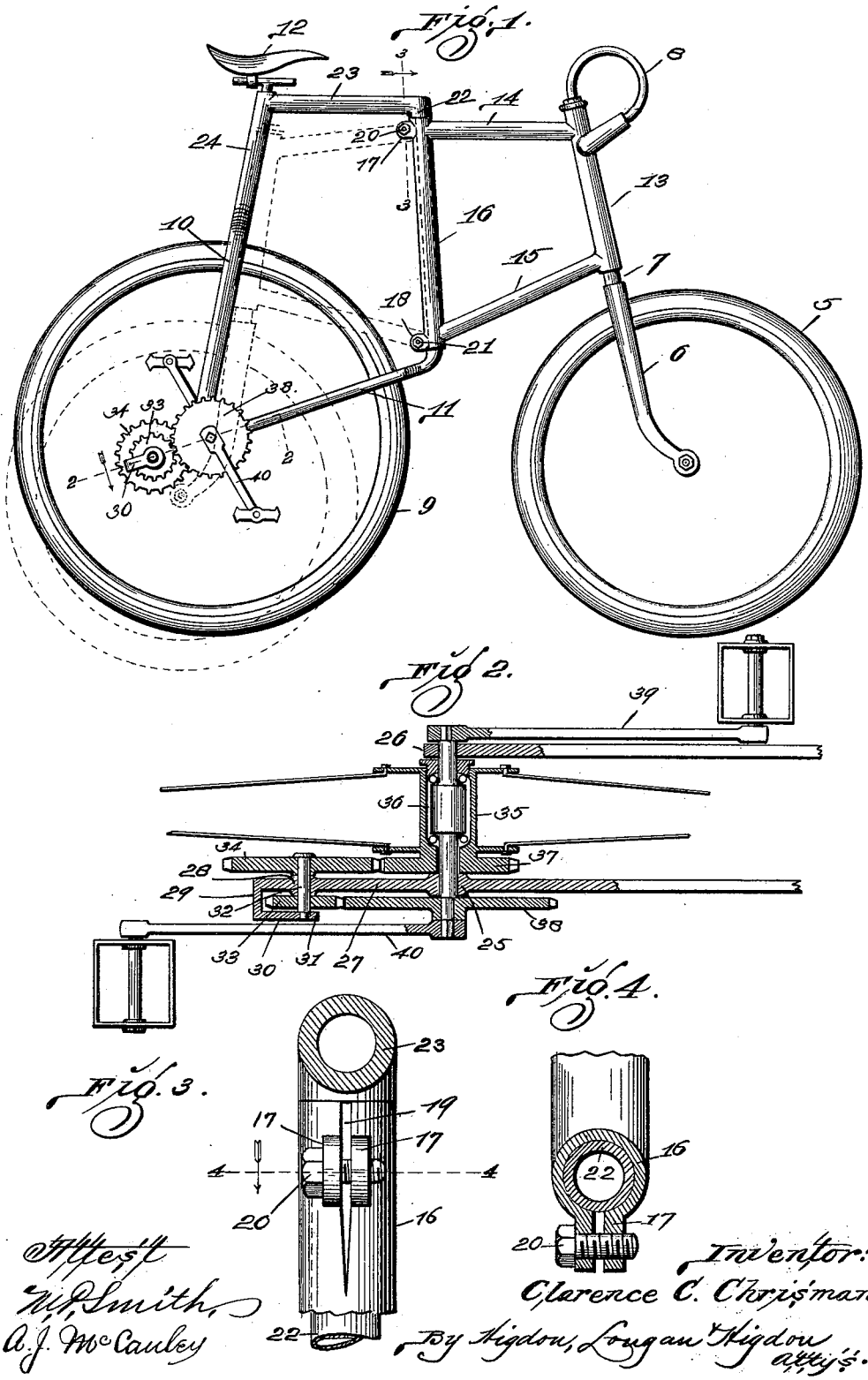
Inventor:
Clarence C. Chrisman
By Higdon, Longan & Higdon
att'ys.
Attest:
W. Smith
A. J. McCauley

UNITED STATES PATENT OFFICE.

CLARENCE C. CHRISMAN, OF ST. LOUIS, MISSOURI.

BICYCLE.

SPECIFICATION forming part of Letters Patent No. 613,244, dated November 1, 1898.

Application filed August 31, 1897. Serial No. 650,213. (No model.)

*To all whom it may concern:*

Be it known that I, CLARENCE C. CHRISMAN, of the city of St. Louis, State of Missouri, have invented certain new and useful Improvements in Bicycles, of which the following is a full, clear, and exact description, reference being had to the accompanying drawings, forming a part thereof.

My invention relates to bicycles; and it consists of the novel construction, combination, and arrangement of parts hereinafter shown, described, and claimed.

Figure 1 is a side elevation of my improved bicycle. Fig. 2 is a detail section taken approximately on the line 2 2 of Fig. 1 and looking in the direction indicated by the arrow. Fig. 3 is a vertical cross-section taken approximately on the line 3 3 of Fig. 1 and looking in the direction indicated by the arrow, parts being broken away to economize space. Fig. 4 is a horizontal cross-section taken approximately on the line 4 4 of Fig. 3.

Referring by numerals to the accompanying drawings, 5 is the front wheel. 6 is the front fork; 7, the steering-post; 8, the handle-bar; 9, the rear wheel; 10, the upper rear fork; 11, the lower rear fork; and 12 the seat. The steering-post 7 operates in the tube 13 in the usual way. A bar 14 extends horizontally backwardly from the upper end of the tube 13. The bar 15 extends backwardly and downwardly from the lower end of the tube 13, and the rear ends of the bars 14 and 15 are connected by the tube 16. The bar 15 is a trifle longer than the bar 14, and the lower ends of the tubes 13 and 16 are slightly farther apart than their upper ends.

A pair of ears 17 projects backwardly from the upper end of the tube 16, and a similar pair of ears 18 projects backwardly from the lower end of said tube. A slit 19 is formed through the tube 16 between the ears 17, as as shown in Fig. 3, and a similar slit is formed between the ears 18. The ears 17 are horizontally apertured, and a bolt 20 is inserted through said ears, as required, to draw the ears together and form a split bearing or clamp. The bolt 20 may be screw-seated in one of the ears, or a nut may be screw-seated upon the point of the bolt. A similar bolt 21 is inserted through the ears 18.

A shaft 22 is inserted through the tube 16, said shaft being of such a size that it will readily rotate within the tube when the clamps are loosened and will be gripped and held against rotation when the clamps are tightened. The forward end of the lower rear fork 11 is attached to the lower end of the shaft 22. A bar 23 extends horizontally backwardly from the upper end of the shaft 22, and the seat-supporting tube 24 connects the rear end of the bar 23 with the upper end of the upper rear fork 10. The rear end of the fork 11 is joined to the rear end of the fork 10, and the bearings 25 and 26 are formed at the junction of said forks, said bearings being in horizontal alinement. An arm 27 extends backwardly and downwardly from the bearing 25, and a bearing 28 is formed near the rear end of said arm. An arm 29 extends outwardly from the rear end of the arm 27, and an arm 30 extends forwardly from the outer end of said arm 29 to a point in alinement with the bearing 28, and a bearing 31 is formed in the forward end of said arm 30. The shaft 32 is mounted in the bearings 28 and 31. The spur-gear 33 is mounted upon the shaft 32 between the arms 27 and 30, and the spur-gear 34 is mounted upon the inner end of said shaft. The rear wheel is placed between the bearings 25 and 26, and its hub 35 is constructed as shown in Fig. 2. The shaft 36 is inserted through the hub 35 and mounted in the bearings 25 and 26. The spur-gear 37 is fixed to one end of the hub 35 and meshes with the spur-gear 34. The spur-gear 38 is fixed upon the shaft 36 and meshes with the spur-gear 33.

The pedal-arms 39 and 40 are fixed to the ends of the shaft 36. The shaft 36 is rotatably mounted in the hub 35, and when the pedals are operated motion is communicated from the shaft 36 to the hub 35 through the train of gearing, consisting of the gears 38, 33, 34, and 37. When the bolts 20 and 21 are loosened, the bicycle may be folded, as indicated in dotted lines in Fig. 1, and when thus folded is more convenient for packing and transportation and storing.

I claim—

1. In a bicycle, a folding frame constructed in two parts, the front part being provided with a vertical sleeve, the ends of which are slotted, ears formed on each side of the slots, bolts passing through said ears and the rear part of the frame being provided with a vertical shaft that passes through and is adapted to be clamped in the sleeve, substantially as specified.

2. In a bicycle, a rear fork, one of the arms of which is extended and provided with a return-bend, a shaft arranged for rotation in said fork, pedal-cranks fixed upon the ends of said shaft, a bicycle-wheel mounted for rotation upon the shaft between the arms of the fork, a gear-wheel integral with the hub of said wheel, a second shaft arranged for rotation in the extended portion of the arm of the fork and in the return-bend thereof, a gear-wheel mounted upon one end of said second-mentioned shaft and meshing with the integral gear-wheel of the wheel-hub, a pinion mounted upon said second-mentioned shaft, and a gear-wheel loosely mounted upon the first-mentioned shaft in mesh with said pinion, all substantially as specified.

In testimony whereof I affix my signature in presence of two witnesses.

CLARENCE C. CHRISMAN.

Witnesses:
    EDWARD E. LONGAN,
    ALBERT J. MCCAULEY.